Jan. 13, 1970     J. SCHWARZ     3,489,233
SCALES FOR BALANCES OF THE INCLINATION TYPE
Filed Dec. 1, 1967     3 Sheets-Sheet 1

Inventor:
Josef SCHWARZ
by: Arthur O. Klein
his Attorney

Jan. 13, 1970  J. SCHWARZ  3,489,233
SCALES FOR BALANCES OF THE INCLINATION TYPE
Filed Dec. 1, 1967  3 Sheets-Sheet 3

Inventor:
Josef SCHWARZ
by: Arthur O. Klein
his Attorney 3,489,233
SCALES FOR BALANCES OF THE INCLINATION TYPE
Josef Schwarz, Balingen, Wurttemberg, Germany, assignor to Bizerba-Werke Wilhelm Kraut KG, Balingen, Wurttemberg, Germany, a firm
Filed Dec. 1, 1967, Ser. No. 687,967
Claims priority, application Germany, Dec. 3, 1966, B 90,129
Int. Cl. G01g 23/30
U.S. Cl. 177—178                                   9 Claims

ABSTRACT OF THE DISCLOSURE

In a balance of the inclination type, weight value indicia means which comprise at least two independently movable parts, each of which carries a partial scale for indicating certain decimal units of weight values. Sensing means adapted to sense the position of a member of said balance which is deflected in accordance with the weight load on said balance by moving to and fro. The sensing means are operatively connected to the aforementioned two independently movable parts in such manner, that the movement of the former causes movements of different magnitudes in the latter. Projection means mounted in the balance for projecting the indicated weight values on a frosted glass plate.

BACKGROUND OF THE INVENTION

The invention relates to a scale for a balance of the inclination type. With the novel arrangement of the invention in this type of a balance, the exact position of a measured quantity of a weight value is indicated on first-indicia means and is then sensed by a sensing mechanism and thereafter the measured indicia of the quantity, the weight of which is being determined, is projected by means of a projection arrangement on a frosted-glass plate.

In the known balances the scale diapositive, which is provided with graduation marks and columns of numbers, is pivoted or slid by means of a balance mechanism relative to stationary optical projection means, so that that portion of the scale indicia which has been positioned before the projection means of the device is readable in a considerably enlarged state on a frosted-glass plate, the latter being provided with pick-off indicating means to facilitate reading the indicated value. The advantage of representing the measured quantity of a balance in this manner lies in that the balance mechanism only needs to move relatively small masses and the measuring of the mechanical parts of the balance is also relatively small. However, due to the optical enlarging, a large scale and, consequently, relatively large graduation mark distances are necessary. It is, however, frequently desirable, in order to increase the accuracy of the balance, to provide the scale diapositive with more graduation marks, which are more spaced from each other. This is generally impossible to accomplish because the diapositive cannot be enlarged at will and cannot be subdivided at will because of the technical and cost factors involved. Furthermore, the optical enlargement of the scale in the known balances is also limited because the light energy that can be furnished for projecting the images of the diapositive is limited due to obvious physical limitations. Furthermore, the size of the frosted-glass plate is also limited.

Furthermore, balances, having illuminated weight measuring indicia means, are known, in which the inclination pendulum or similar means pivot in dependency with the magnitude of the load to be measured. After the pendulum has ceased to pivot it is clamped to the frame of the balance. Thereafter a follower or sensing mechanism, which is coupled to a scale diapositive, measures the deflection of the pendulum between 0 and its new rest position. The distance covered by the follower or sensing mechanism constitutes in this type of a balance a measure of the to be measured weight load. This distance traversed by the follower or sensing mechanism can easily, and without considering the movability of the mechanism, be considerably enlarged by mechanical and/or optical means. In the aforedescribed arrangement, in which the scale diapositive is directly pivoted by the balance lever, stronger enlargements, and thereby more detailed reading of the scales can be obtained. The size and increased cost of the follower or sensing mechanism and associated scale, as well as the required brightness of the projected image, constitute limits, however, also in this known arrangement.

SUMMARY OF THE INVENTION

It is therefore a general object of this invention to provide an inclination balance having a follower or sensing mechanism, in which the graduation-mark distances and the number of graduation marks can be increased by simple means to quantities which were heretofore unattainable in the inclination balances of the prior art, thereby increasing the accuracy of the balance.

The object of the invention is solved by providing a scale which is divided into at least two independently movable parts, each of which constitutes a partial scale for indicating certain units of weight measurements. The part of the scale which indicates the smaller measured weight units is operatively connected by larger transmission means to a follower mechanism than that portion of the scale which indicates the larger measured weight units. A projection arrangement is provided in the balance of this invention for projecting the scaled indicia of both partial scales on a common area of a frosted-glass plate.

In a preferred embodiment of a scale in accordance with this invention, the partial scale having the smaller measured unit indicia is rotatably mounted, the scale indicia itself being embodied as a circumferential scale, which is connected by means of a gear wheel-gear rod-mechanism to a follower or sensing mechanism. The partial scale having the larger measured unit indicia is embodied as a linear scale which can be linearly moved by the same follower or sensing mechanism. It is possible to arrange the circumferential scale into a column of numbers, the latter being divided into decimal entities.

In order to facilitate the reading off of the measured weight indicia in the balance after the weighing operation is completed, it has been found to be advantageous to provide for the larger measurement units a digital scale and for the smaller measured units an analog or digital scale. For operation of the latter scale there is provided, in a preferred embodiment of the invention, an arrangement wherein at least one of the partial scales has a toothed portion. When the position of this partial scale is adjusted in accordance with the sensing of the measuring lever by the sensing mechanism, a pawl engages the toothed portion in such a way that the partial scale reverses its movement a short distance until the pawl engages with the nearest tooth of the toothed portion.

The principle of this invention can be incorporated into a particularly simple and light balance structure which has a partial decimal scale with only a single column of numbers which is, by means of a pin wheel, driven by the sensing mechanism, the latter selectively engaging or disengaging said pin wheel. The return movement of the pin wheel is limited by a disengageable pawl. The

BRIEF DESCRIPTION OF THE DRAWING

The novel features which are considered as characteristic for the invention are set forth in particular in the appended claims. The invention itself, however, both as to its method of operation and its construction, together with additional objects and advantages thereof, will be best understood from the following description when read in connection with the accompanying drawing, in which:

DETAILED DESCRIPTION

Figure 1:
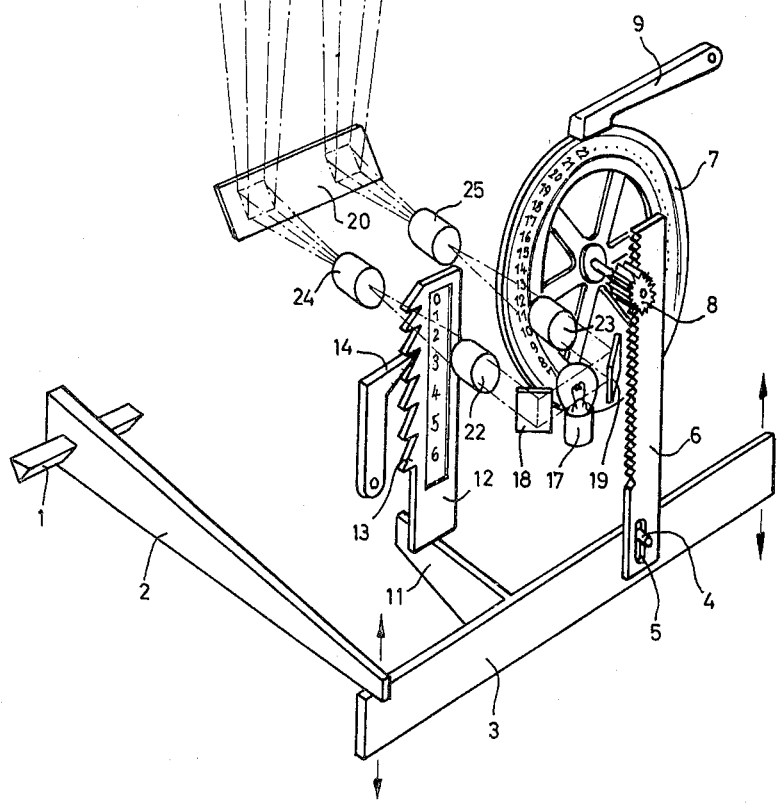
FIG. 1 is a schematic illustration in perspective of a first embodiment of a scale arrangement of this invention with a cooperating follower or sensing mechanism.

Referring now in detail to the drawing, in which similar parts are designated with the same numerals, three different embodiments of scale arrangements have been illustrated in FIGS. 1–4 which are adapted to be incorporated into balances which operate under the follower or sensing principle. However, the subject matter of the invention may also be incorporated into other types of balances. The scales illustrated in the drawing are assumed to cooperate with balances which have follower or sensing mechanisms and which, when loaded, have an arrangement of some of their parts undergo a certain pivotal movement and then come to rest, thereafter said parts being securely positioned. After the securing of said parts, the position of a projecting member, is scanned and sensed by a follower or sensing mechanism which then indicates the measured value via projection means which will be more fully described hereafter. Instead of utilizing an arrangement wherein the follower or sensing mechanism traverses a measured distance, it is also possible to use measuring means which are, after the pivotal movement of the balance mechanism, coupled to the latter and then moved backwards over the traversed distance. Such types of balance systems are also known in the art and are therefore not described here in detail.

FIG. 1 illustrates only a portion of the follower or sensing mechanism of a balance with the associated scales and optical projection and indicating means. Those parts which have not been illustrated are known insofar as their arrangement, operation and construction are concerned, and have been omitted for simplicity and clarity sakes. The detailed construction and arrangement of an inclination balance having a sensing mechanism is, for example, described in U.S. Patent No. 3,129,879.

A measuring bar 2, having a transverse knife-edge support beam 1, is operatively coupled to a known balance mechanism (not illustrated). Thus the bar 2 is deflected in accordance with the load on the balance. A transverse bar 3 is movably mounted in the direction of the double arrow and forms part of the aforementioned follower or sensing mechanism. The transverse bar 3 has a pin 4 which projects into a slit 5 of a toothed rack 6, which is in engagement with a toothed wheel 8. The latter is rigidly axially secured via a shaft to a weight-indicating dial 7. The lower weight values, for example the one- and ten-unit decimals, are located on a diapositive which is mounted on the dial 7. The dials 7 of FIGS. 1 and 2 have a single column having columns of numerals 0 to 99, that is of the one- and ten-unit decimals, and are provided with corresponding graduation marks which represent five units of the first decimals after the comma. Such a column of numbers and corresponding graduations or a similar column can also be arranged on the dial 7 in ten-unit multiples of a decimal, for example, 00, 10, 20 . . . 90 which follow each other without interruption.

A brake lever 9 cooperates with the dial 7 and is operatively connected to electro-magnetic means (not illustrated) which are adapted to selectively cause the lever 9 to bear against the periphery of the dial 7 or, when the dial is to be released, to lift off said periphery.

A reciprocally movable scaled bar 12 cooperates with the projecting arm 11 of the transverse bar 3. On the bar 12 there is mounted a diapositive having a scale with numbers representing the higher unit weight values, that is to say for example units of one hundred. The scaled bar 12 is reciprocally movably mounted in guide means (not illustrated), and has the tendency to return to its original starting (zero position) either due to gravitational forces and/or due to biasing means (not illustrated). One of the sides of the bar 12 is provided with a toothed portion 13 which engages with a pivotally mounted pawl 14. For each number on the diapositive of the bar 12 there is provided a corresponding tooth on the toothed portion 13. The pawl 14 is operatively connected to actuating means, for example electro-magnetic means (not illustrated), which selectively cause the pawl 14 to engage or disengage a tooth of the toothed portion 13.

The numbers on the diapositives of the dial 7 and bar 12 are projected with the aid of a projection arrangement side by side on a common indicator frosted glass plate 15, where the projected numbers can be conveniently read off with the aid of an indicator mark 16. The projection arrangement comprises a common light source 17 and the deflection mirrors 18, 19, 20 and 21 as well as a pair of condenser lenses 22, 23 and objective lenses 24, 25.

The numbers on the diapositive of the bar 12 are projected via the condenser lens 22 and the objective lens 24 whereas the numbers on the diapositive of the dial 7 are projected via the condenser lens 23 and the objective lens 25.

Figure 2:
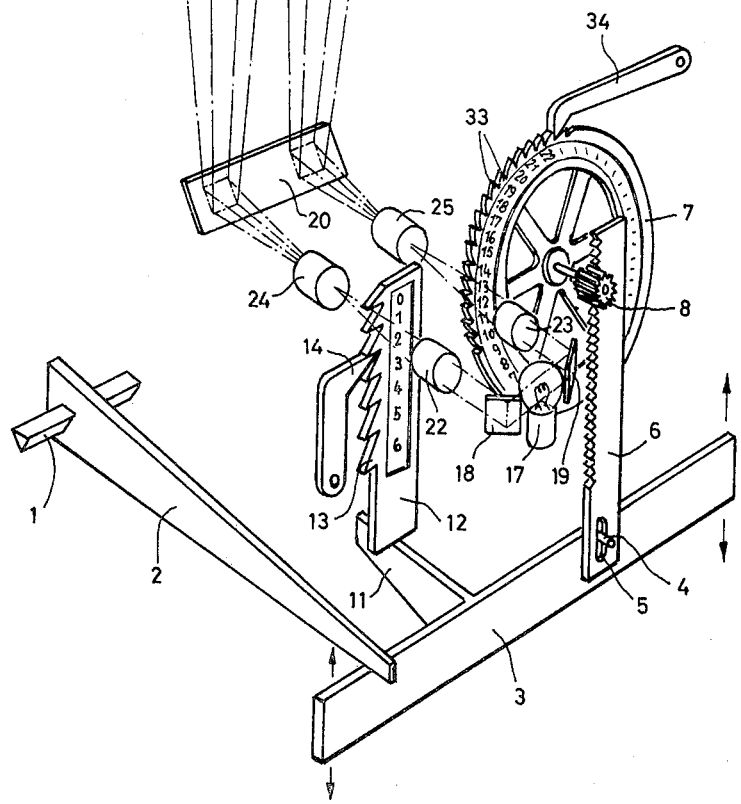
FIG. 2 is a schematic illustration, in perspective of a second embodiment of a scale arrangement of this invention which only indicates digitally the measured weight results. The cooperating follower or sensing mechanism is also illustrated.

FIG. 2 illustrates another embodiment of the invention in which all weight values are indicated digitally. This can be accomplished by providing the dial 7, with a toothed periphery 33 and placing the dial 7 under the influence of a torsion spring (not illustrated), which causes the dial 7 to return to its zero position. The toothed periphery 33 is adapted to be engaged by a pivotally mounted pawl 34. For each number on the dial 7 there is provided a corresponding tooth on the toothed periphery 33.

Figure 3:
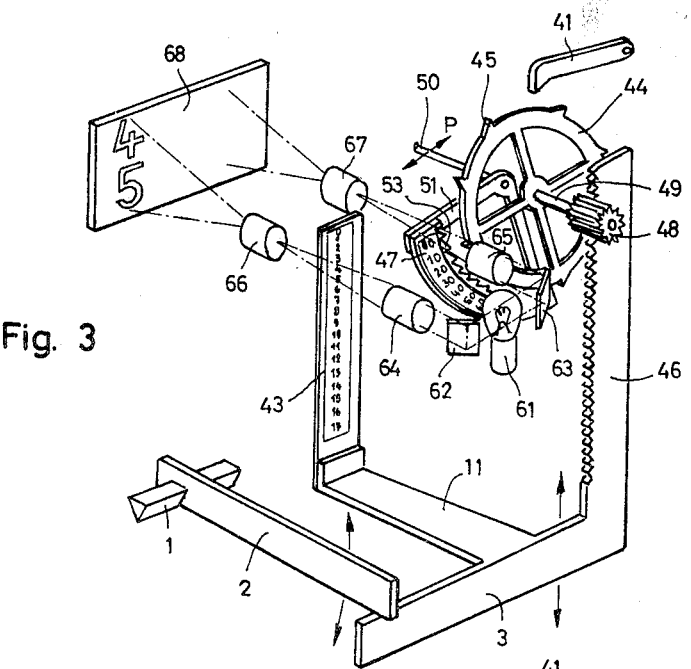
FIG. 3 is a schematic illustration in perspective of a third embodiment of a scale arrangement of this invention with a cooperating follower or sensing mechanism, the ensemble being illustrated in a first position.
Figure 4:
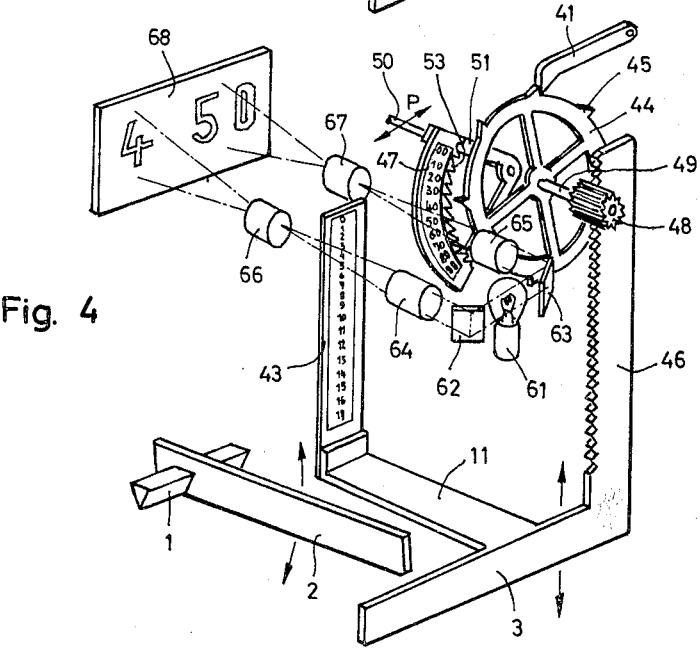
FIG. 4 illustrates schematically and in perspective the arrangement of FIG. 3 in a second position.

FIGS. 3 and 4 illustrate a further embodiment of the invention, in which the dial 7 does not have a full 360° circumference but is formed only as a circular segment 47. The diapositive on the circular segment 47 carries only a single column of numbers, for example, 00, 10, 20, . . . 90. This arrangement is particularly advantageous because the movable masses of the arrangement are quite small and the manufacturing costs of the balance can be reduced to a minimum.

The measuring bar having the transverse knife edge 1 is again designated with the numeral 2. The transverse bar 3, which is reciprocally mounted and which forms part of the follower or sensing mechanism, is rigidly connected via the arm 11 with a scaled bar 43. The latter has mounted thereon a diapositive on which there are arranged a column of successive numbers, which represent the hundred- and thousand-unit decimals of the weight value.

A toothed rack 46 which is integral with the transverse bar 3 engages with the toothed gear wheel 48, which is drivingly connected via a shaft 49 to the star wheel 45. The latter is provided at its outer periphery with teeth 45 which cooperate with a pivotally mounted pawl 41. The latter can be actuated by electro-magnetic means (not illustrated). The number of teeth 45 is determined by the measuring range of the balance and the number of revolutions of the star wheel 44. A circular segment member 47 is mounted on a separate shaft 50 by means of a suitable support structure 51. The latter has an inwardly projecting toothed portion 53 the diameter of which corresponds substantially to that of the star wheel 44 so that the teeth 45 can properly engage the toothed portion 53. In order to obtain the engagement between the teeth 45 of the star wheel 44 and the toothed portion 53, the shaft 50 is transversely reciprocally mounted as indicated by the double arrow P. The mechanism for transversely reciprocally movably supporting the shaft 50 is, for simplicity sake, not illustrated in the drawing.

The numbers on the diapositive of the scaled bar 43 and the circular segment member 47 are projected by means of an optical projection arrangement onto a frosted glass plate 68. The optical projection arrangement projects the numbers in a known manner by means of the light source 61 via the deflection mirrors 62, 63, condensers 64, 65 and objectives 66, 67 onto the frosted glass plate 68.

OPERATION OF THE SCALE ARRANGEMENTS

The arrangement illustrated in FIG. 1 operates as follows: when the balance mechanism of the inclination balance is loaded with a load, the mechanism is fixed after the balance mechanism has been leveled. The measuring bar 2 is thereby also arrested and securely fixed. The transverse bar 3 is then moved by a known driving system, which is not described in detail (see the aforementioned U.S. Patent No. 3,129,879) until this transverse bar 3, which forms part of the sensing or followers system of the arrangement of this invention, bears against the measuring bar 2. Simultaneously therewith, the toothed rack 6 is moved upwardly via the pin 4 and slit 5 by the bar 3, thereby rotating the dial 7 due to the engagement of the teeth of the rack 6 and wheel 8. When the dial 7 has come to rest, its position is again fixed by the brake lever 9. The latter can be actuated, for example, by a contact switch, which is closed when the transverse bar 3 contacts the measuring bar 2. The numbers on the diapositive of the dial 7, that is to say the one- and ten-unit decimal, which are thus positioned in the optical path of the condenser 23 and the objective 25, are projected on the frosted glass plate 15.

The projecting arm 11 of the transfer bar 3, when the latter is raised, also moves the bar 12 upwardly so that the number on the diapositive of the bar 12, which is positioned between the condenser 22 and objective 24, is also projected on the frosted glass plate 15. Simultaneously with the lowering of the brake lever 9, the pawl 14 engages the toothed portion 13. Thereafter, the transverse bar 3 is again lowered. Any further movement of the dial 7 is thus blocked by the brake lever 9, and the pin 4 of the transfer bar 3 slides downwardly in the slit 5. During the downward movement of the transverse bar 3, the bar 12 follows, due to its own weight, or due to the action of a spring (not illustrated) until the pawl 14 bears against the horizontally extending side of the adjacent tooth of the toothed portion 13. By thus positioning the bar 12, the projected number thereof on the frosted plate 15 is correctly positioned on the frosted glass plate 15 so that it corresponds to the hundred-unit decimal position. In the embodiment illustrated in FIG. 1, the hundred-unit decimal numbers of the bar 12 are indicated digitally, whereas the one- and ten-unit decimals of the dial 7 are indicated analogally due to the arbitrary blocking position of the brake lever 9.

The operation of the embodiment illustrated in FIG. 2 can be mainly differentiated from the operation of the embodiment illustrated in FIG. 1 as follows: when the transverse bar 3 is again lowered, the pawl 14 does not only engage the toothed portion 13 but the pawl 34 also engages the toothed periphery 33. Consequently both the bar 12 and the dial 7 reverse their motions until the sides of the respective teeth are engaged by their corresponding pawls, thereby preventing a further reverse motion. Since each tooth corresponds to a particular number, there can be obtained in this manner an exact digital indication of the measured weight value.

The embodiment illustrated in FIGS. 3 and 4 operates as follows:

The measuring bar 2 which is deflected in accordance with the load placed on the balance is fixed after the leveling of the balance. A transverse bar 3, which forms part of the follower or sensing mechanism, is raised by means of a known driving mechanism which is not discussed in detail (see the aforementioned U.S. Patent No. 3,129,879) in the upward direction of the double arrow until it bears against the measuring bar 2. The distance traversed by the bar 3 from a zero position to the contact position with bar 2 constitutes a measure of the load on the balance. When the bar 3 is raised the star wheel 44 is rotated via the bar 46 and toothed wheel 48. Simultaneously therewith the scaled bar 43, which is rigidly secured to the bar 3, rises.

After the transverse bar 3 has touched the measuring bar 2 the pawl 41 falls onto the outer periphery of the star wheel 45. This controlled movement of the pawl 41 can be accomplished by providing an electromagnetic control mechanism (not illustrated) which can be actuated by means of a contact switch which is closed when the transverse bar 3 contacts the measuring bar 2. Simultaneously with the falling of the pawl 41, the shaft 50 with the support structure 51 and the circular segment 47 is slidably moved in the direction of the arrow P toward the shaft 49 so that the teeth 53 engage with the teeth 45 of the star wheel 44. In this manner the circular segment 47 is coupled to the star wheel 44, so that when the latter is rotated it entrains the circular segment 47.

The balance mechanism illustrated in FIGS. 3 and 4 is shown to have been loaded by a 450 weight unit load. The region between the numerals 4 and 5 of the hundred-unit decimals on the diapositive of the scaled bar 43 is shown to be projected onto the frosted glass plate 68 in FIG. 13, whereas the diapositive of the circular segment member 47 has not as yet been moved into the light path of the projection arrangement because the member 47 is retained in position by a stop member (not illustrated). The corresponding area on the frosted glass plate 68 remains, consequently blank.

Thereafter the transverse bar 3 is lowered (see FIG. 4) until the side of the nearest tooth 45 abuts against the pawl 41. The resulting reverse motion of the star wheel 44 causes the circular segment member 47 which is coupled therewith by means of its toothed portion 53 to swing through a predetermined angle so that the to be indicated weight value, in the case of FIG. 4 a value of 50, is positioned in the light path of the projection means and projected onto the frosted glass plate 68. Simultaneously therewith, the scaled bar 43 is lowered a corresponding distance. Thus both scales are properly situated for a digital indication of the measured weight value by the projection means.

The embodiment illustrated in FIGS. 3 and 4 may be altered so that in lieu of the toothed portion 53 and the teeth 45 a friction coupling is provided which, for example, may consist of an arrangement of elements made of rubber. In this manner the lower weight values can be indicated analogally in a manner similar to that of FIG. 1.

In the foregoing, the invention has been described in connection with preferred arrangements thereof. However, many other variations and modifications will now become obvious to those skilled in the art.

What is claimed is:

1. In a balance of the inclination type, an improved scale arrangement including weight value indicia means; the latter comprising two independently movably mounted partial scale members for indicating different decimal units of weight values;

a weight measuring member pivotally operatively mounted in said balance, the deflection of said weight measuring member from a zero position constituting a measure of the weight of a load on said balance;

sensing means operatively mounted in said balance and adapted to sense the position of said weight measuring member when the latter has reached a position of rest;

transmission means respectively operatively connected to said sensing means, on the one hand, and to said two independently movable partial scale members, on the other hand, so that a movement of the former causes movements of different magnitudes in the latter; and light projection means operatively mounted in said balance, said projection means comprising a light source and mirror means for guiding light from said light source via said two partial scale members onto common light projection receiving means;

said two independently movably mounted partial scale members includes a first partial scale member for indicating lower decimal weight values and a second partial scale member indicating higher decimal weight values.

2. In a balance of the inclination type, the improved scale arrangement as set forth in claim 1, wherein said first and second partial scale members have respectively mounted thereon first and second diapositives having respectively first and second columns of members representing different decimal weight value units which correspond respectively to the lower and higher weight values for said balance.

3. In a balance of the inclination type, the improved scale arrangement as set forth in claim 2, wherein said light projection receiving means comprise a frosted glass plate for receiving the light images of numbers projected from said first and second column of numbers.

4. In a balance of the inclination type, the improved scale arrangement as set forth in claim 2, wherein said first partial scale member has the shape of a circular segment, having a first toothed portion thereon, said first column of numbers including only one decimal weight value unit, said circular segment being axially rotatably and slidably mounted in said balance, a star wheel rotatably mounted in said balance and operatively connected to said sensing member, said star wheel being adapted to be selectively engaged by said first toothed portion, a first pawl operatively mounted in said balance for selectively engaging said star wheel so as to limit the reverse motion thereof.

5. In a balance of the inclination type, the improved scale arrangement as set forth in claim 2, wherein said first partial scale member comprises a disc rotatably mounted in said balance and connected to said sensing means by gear means, and said second partial scale member comprises a bar which is reciprocally mounted in said balance.

6. In a balance of the inclination type, the improved scale arrangement as set forth in claim 5, wherein said first column of numbers constitutes an analog scale of numbers and said second column of numbers constitutes a digital scale of numbers.

7. In a balance of the inclination type, the improved scale arrangement as set forth in claim 5, wherein said first column of numbers constitute a digital scale of numbers and said second column of numbers constitute a digital scale of numbers.

8. In a balance of the inclination type, the improved scale arrangement as set forth in claim 5, wherein said first column of numbers on said first partial scale member is of circular configuration having two ends which overlap.

9. In a balance of the inclination type, the improved scale arrangement as set forth in claim 5, wherein said second partial scale member is formed as a bar having a second toothed portion, and a second pawl adapted to selectively engage said second toothed portion, in such a manner that said sensing means undergo a slight reverse motion after having sensed the position of said weight measuring member and before coming to a position of rest.

References Cited

UNITED STATES PATENTS

| | | | |
|---|---|---|---|
| 1,830,050 | 11/1931 | Carroll | 177—178 |
| 2,348,374 | 5/1944 | Williams | 177—178 |
| 2,582,517 | 1/1952 | Williams | 177—178 |
| 3,059,709 | 10/1962 | Karp | 353—82 X |
| 3,132,558 | 5/1964 | Wymann | 353—41 |
| 3,129,879 | 4/1964 | Kuhnle et al. | |

FOREIGN PATENTS 677,678    6/1939    Germany.

RICHARD B. WILKINSON, Primary Examiner

G. H. MILLER, JR., Assistant Examiner